No. 832,788. PATENTED OCT. 9, 1906.
J. A. GEE.
ATTACHMENT FOR WINDOW AND DOOR SCREENS.
APPLICATION FILED JULY 5, 1906.
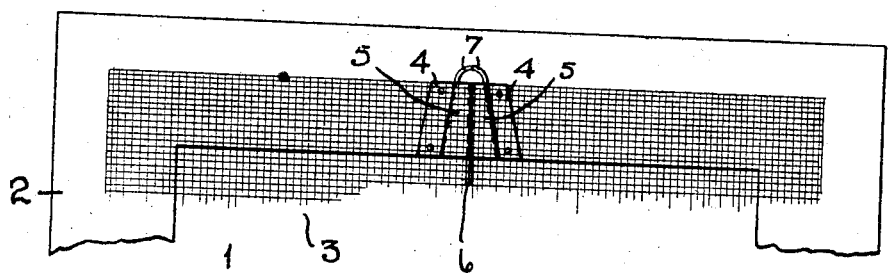
Fig. 1.
Fig. 2.
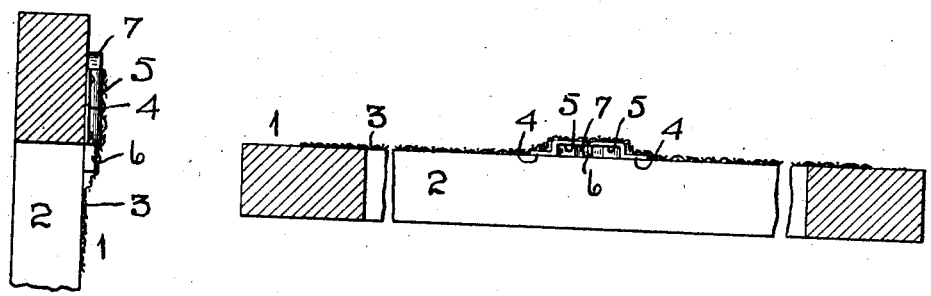
Fig. 3.
Fig. 4.
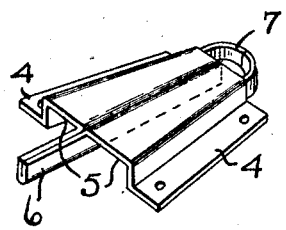
Witnesses
L. B. James
C. H. Giesbauer
Inventor
J. A. Gee
by H. B. Willson & Co.
Attorneys
THE NORRIS PETERS CO., WASHINGTON, D. C.

UNITED STATES PATENT OFFICE.

JOHN A. GEE, OF CRIPPLE CREEK, COLORADO.

ATTACHMENT FOR WINDOW AND DOOR SCREENS.

No. 832,788.     Specification of Letters Patent.     Patented Oct. 9, 1906.

Application filed July 5, 1906. Serial No. 324,850.

*To all whom it may concern:*

Be it known that I, JOHN A. GEE, a citizen of the United States, residing at Cripple Creek, in the county of Teller and State of Colorado, have invented certain new and useful Improvements in Attachments for Window and Door Screens; and I do declare the following to be a full, clear, and exact description of the invention, such as will enable others skilled in the art to which it appertains to make and use the same.

This invention relates to attachments for window and door screens.

The object of the invention is to provide an attachment of this character by means of which easy escape is provided for flies or other insects from a room or compartment, means being provided whereby the entrance through said escapements will be barred.

With the above and other objects in view the invention consists of certain novel features of construction, combination, and arrangement of parts, as will be hereinafter described and claimed.

In the accompanying drawings, Figure 1 is a side view of a portion of a window-screen, showing the application of the invention thereto. Fig. 2 is a vertical sectional view. Fig. 3 is a horizontal sectional view, and Fig. 4 is a detail perspective view of the attachment removed from the screen.

Referring more particularly to the drawings, 1 denotes a window-screen, which may be of any desired construction, comprising a frame 2, upon which is tacked or otherwise secured a screen or netting 3.

The attachment is preferably formed of sheet metal bent to form attaching-flanges 4, between which are formed one or more conical-shaped passages 5. The passages 5 are formed by bending the metal forming the attachment into the desired shape. In the drawings the attachment is shown as being provided with two conical-shaped escapement-passages.

The metal forming the attachment is bent or folded together between each escapement-passage to form a rib or partition 6, terminating in a fender by means of which flies or other insects crawling across the screen will be directed into the escapement-passages 5. Arranged on the upper or outer end of the attachment and preferably formed integrally therewith are inwardly-curved stop-strips 7, the ends of which are adapted to meet above the outside of the escapement-passages, as clearly shown in the drawings. The stop-strips 7 are so arranged as to permit a free exit of the flies or other insects passing through the escapement-passages 5, but which serve as a bar or detent to the entrance of insects through said passages.

The attachment may be applied to any form of window or door screen, and is applied to the same by removing one or two of the netting-securing tacks from the frame and inserting between said netting and the frame the attachment, said attachment being secured in place by means of tacks or other suitable fastening devices. The attachments are usually placed along the upper edge of the screen, as it is a well-known fact that the flies or other insects always move toward the upper ends of the screen in their efforts to escape through a door or window, so that the arrangement of the escaping devices as herein shown and described will provide a ready exit through which the insects may pass out.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A screen attachment of the character described, comprising a plate bent centrally to form a rib and having its sides bent downwardly and formed with attaching-flanges, said rib being provided with a fender extension to direct the course of insects to the passages formed by said rib and the bent sides of the plate, and means to deter the entrance of insects to the outer or discharge end of the passage; substantially as set forth.

2. A screen attachment of the character described, comprising a plate formed with longitudinal channels, a fender projecting below the lower end of said plate to direct the course of insects to the channels, and a guard extending over and spaced above said channels, to deter the entrance of insects to the outer or discharge ends of said passages; substantially as set forth.

In testimony whereof I have hereunto set my hand in presence of two subscribing witnesses.

JOHN A. GEE.

Witnesses:
R. W. RUDD,
JOHN WOOD.